United States Patent [19]

Tusinski et al.

[11] Patent Number: 4,674,190

[45] Date of Patent: Jun. 23, 1987

[54] BLOCKED LENS THICKNESS GAUGE

[75] Inventors: Joseph Tusinski, Muskogee; Herbert H. Mathews, Wagoner, both of Okla.

[73] Assignee: Coburn Optical Industries, Inc., Muskogee, Okla.

[21] Appl. No.: 735,003

[22] Filed: May 17, 1985

[51] Int. Cl.⁴ .............................................. G01B 5/20
[52] U.S. Cl. ..................................... 33/172 R; 33/507
[58] Field of Search .............................. 33/172 R, 507

[56] References Cited

U.S. PATENT DOCUMENTS

| | | | |
|---|---|---|---|
| 2,646,627 | 7/1953 | Tillyer et al. | 33/507 X |
| 2,834,115 | 5/1958 | Bachmann | 33/172 R |
| 3,645,002 | 2/1972 | Hefti | 33/172 R |
| 3,848,339 | 11/1974 | Strasbaugh . | |
| 3,861,048 | 1/1975 | Thompson | 33/507 |
| 4,010,548 | 3/1977 | Iwasaki . | |
| 4,075,763 | 2/1978 | Yamaryo . | |
| 4,137,640 | 2/1979 | Parks . | |
| 4,557,076 | 12/1985 | Helbrecht . | |

FOREIGN PATENT DOCUMENTS 113289  2/1945  Sweden .............................. 33/172 R

*Primary Examiner*—Harry N. Haroian

[57] ABSTRACT

Disclosed is a blocked lens thickness gauge for measuring the thickness of a semi-finished lens that is blocked for surfacing of the concave side thereof. A lens contacting sensor shaft is supported between two sets of orthogonally mounted ball bearings and a needle shaft, the latter being supported on spring-loaded bearings such that the needle shaft is urged toward the lens contacting sensor shaft by the spring loading. A slipping clutch is also provided to allow the needle shaft to absorb inertia forces resulting from abnormal shocks.

9 Claims, 7 Drawing Figures

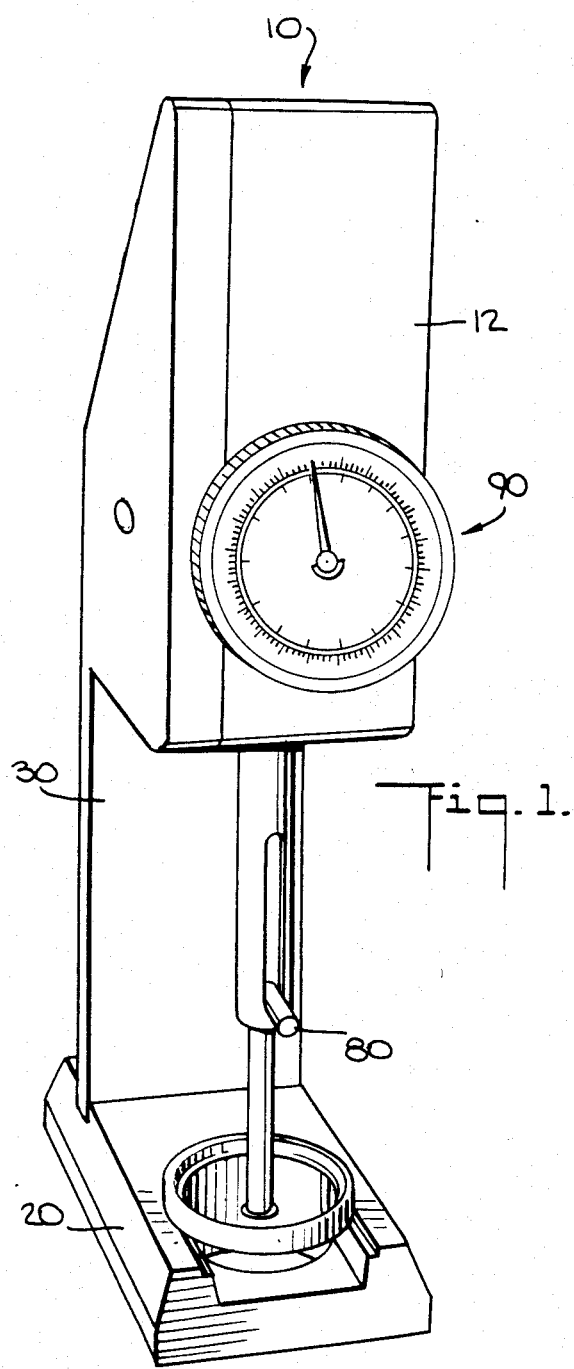
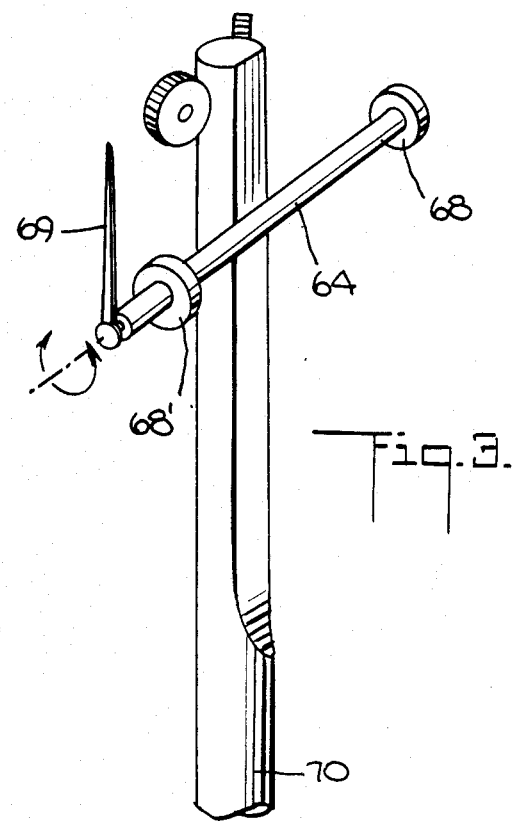
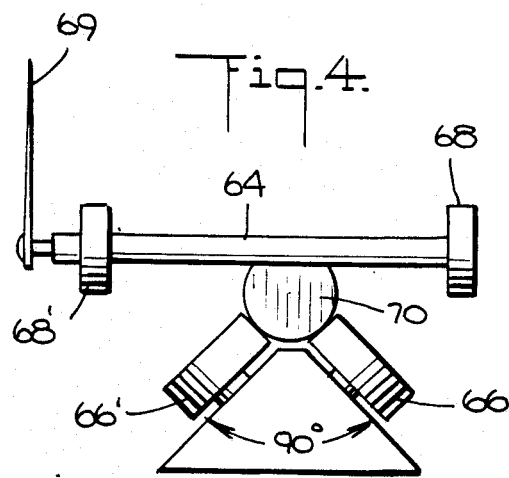
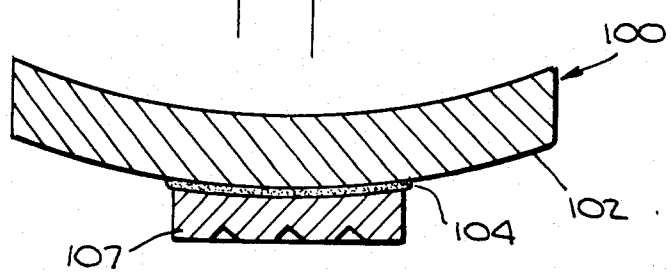

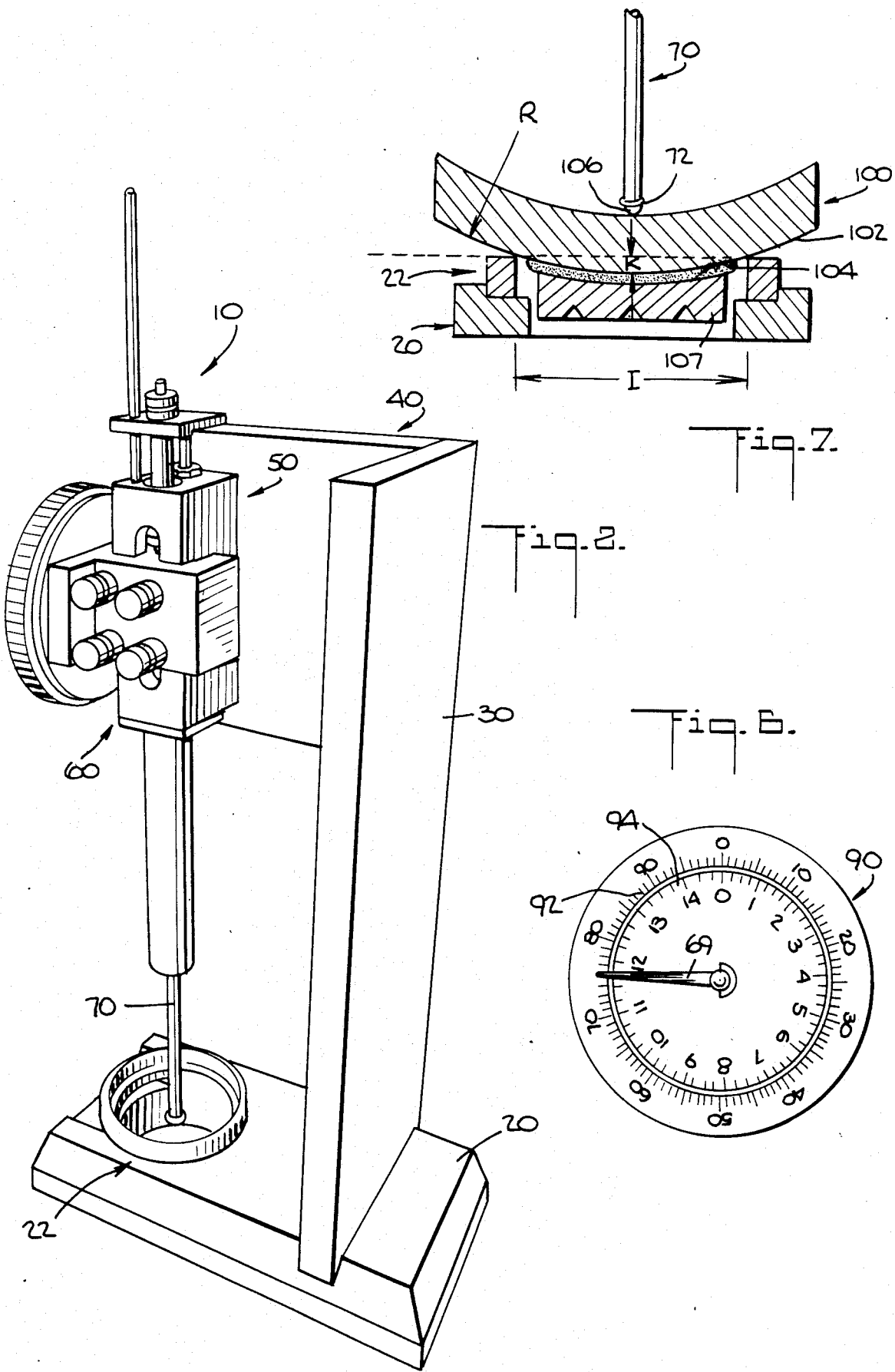

BLOCKED LENS THICKNESS GAUGE

BACKGROUND OF THE INVENTION

1. Field of the Invention

This invention relates to a device for the measurement of the thickness of a blocked lens, and more particularly to a gauge suited for measuring the thickness of a lens supported on a block and using said thickness value to calculate other parameters of the lens.

2. Description of the Prior Art

In the manufacture of optical lenses such as eyeglasses or the like, it is necessary to produce the shape and dioptric power required by the prescriptions for the lenses. The accuracy of required properties so provided largely depends on the accuracy of measurements taken of the lenses during their laboratory processing. It is therefore necessary to provide means for accurately determining thickness and curvature of lenses. The task of accurately measuring lens parameters is complicated by the use of a lens holding block having variable thickness.

The prior art frequently utilizes templates against the workpiece for the determination of radius thereof. However, this requires the availability of a series of such templates and the matching process is slow and cumbersome since the fit of the template against the workpiece must be visually determined.

Spherometers and the device called Geneva Gauge are also used for measuring the radii of curvatures. The spherometers are used in conjunction with charts by which the sagitta measured is converted into radius of curvature or diopters. The Geneva Gauge, on the other hand, is calibrated to read directly in diopters. These devices are based on the same geometric principle. Namely, a device based on this principle has fixed contact points, usually steel balls, that are spaced apart twenty to fifty millimeters on the underside of the device. In use, these points contact the surface to be measured. Midway between the two fixed points is a plunger that moves up and down against spring tension on a line perpendicular to a line between the pair of fixed points. The up and down motion of the plunger rotates a pinion gear through a rack, integral with the plunger. On the same shaft with the pinion gear is an indicator needle capable of only two revolutions relative to the dial face, one revolution for convex curves and one for concave curves. The dial face is calibrated to read directly in diopters in increments of one-eighth diopter. The range of measurement is 17 diopters for both concave and convex curves.

Notwithstanding their advantages, the use of conventional mechanisms in these devices, such as racks, gears and other clock-work like components, results in a high failure rate. Such failure is most often caused by shock to the device, such as caused by sudden contact with other objects and personnel in the ophthalmic laboratory resulting in imprecise measurements or breakage.

It is therefore the principal object of the present invention to provide a simple, shockproof yet highly accurate device for measuring the blocked thickness of optical lenses.

It is another object of the present invention to utilize a rugged mechanism void of conventional components ordinarily used in lens measuring devices.

It is still another object of the invention to provide a device which directly shows the measured lens thickness and the dioptric power of the lens surface on a scale.

Other objects and advantages will be apparent from the description that follows.

BRIEF DESCRIPTION OF THE DRAWINGS

FIG. 1 is a perspective view of the Blocked Lens Thickness Gauge of the present invention, showing the device with the "cover" thereon;

FIG. 2 is another perspective view of the device of the present invention without the "cover" thereon;

FIG. 3 is a schematic representation of the kinematic operation of the basic mechanism of the device;

FIG. 4 is an end elevation view of the relative positions of the shafts;

FIG. 5 is a fragmentary, semi-schematic view of the blocked lens;

FIG. 6 shows the dial-face of the Blocked Lens Thickness Gauge; and

FIG. 7 shows a blocked lens mounted on the base of the device, and the measuring shaft contacting the blocked lens.

SUMMARY OF THE INVENTION

With reference to the drawings in which like reference numerals designate like or corresponding parts throughout the several views and with particular reference to FIGS. 1 and 2, the numeral 10 generally indicates the Blocked Lens Thickness Gauge device of the present invention. FIG. 2 shows the device without the cover, FIG. 1 shows the device with cover 12 thereon. The main structural components of the device are: base support member 20; ring member 22; vertical support member 30; horizontal support member 40; plunger support assembly 50; needle shaft assembly 60; sensor shaft 70; sensor shaft handle 80; and dial gauge 90.

The invention provides a blocked lens thickness gauge comprising in combination:

- a generally rectangular base support member having a ring member thereon proximal to one end thereof;
- a vertical support member projecting perpendicularly from said base support member and proximal to the other end of said base support member;
- a horizontal support member projecting from said vertical support member distally positioned from and parallel to said base support member;
- a plunger support assembly and
- a needle support assembly suspended from said horizontal support member, said assemblies housing:
- a lens contacting sensor shaft supported between two sets of orthogonally mounted ball bearings; and a needle shaft positioned orthogonally to said lens contacting sensor shaft in a cooperating relationship; said needle shaft being supported on spring-loaded bearings such that the needle shaft is urged toward the lens contacting sensor shaft by said spring loaded bearings; and
- indicator means connected to one end of said needle shaft and responsive to movement of said sensor shaft for indicating the thickness of a lens supported by said ring member.

Simply described, in operating the device, the dial gauge 90 is rotated until the indicator needle 69 is indicating the dioptric surface power of the blocked lens to be measured; the sensor shaft 70 is raised by the use of sensor shaft handle 80 and the blocked lens is inserted into ring member 22; using sensor shaft handle 80 the sensor shaft 70 is lowered until it contacts the concave side of the lens, as shown in FIG. 7, and reading the thickness of the lens on dial gauge 90. Thickness graduations are on the outer scale 92, whereas, the surface dioptric power is graduated on the inner scale 94.

DETAILED DESCRIPTION OF THE DRAWINGS

FIG. 3 shows the basic mechanism, in a schematic fashion, enabling the operation of the lens thickness measuring device in a simple yet highly desirable manner wherein: sensor shaft 70 and needle shaft 64 are positioned orthogonally to each other in a cooperative relationship. As can be seen in FIG. 4, sensor shaft 70 is cradled on two sets of orthogonally mounted ball bearings 66 and 66' (cradle bearings), said sets of ball bearings having surfaces tangent to the surface of sensor shaft 70 and having mounting axes which are displaced by 90°. Any movement of ball-bearings 66 and 66' on their axes parallel to their tangent point will not change the location of sensor shaft 70. Spring-loaded bearings 68 and 68' urge needle shaft 64 against sensor shaft 70, and holding same in position dictated by the relative position of cradle bearings 66 and 66'. Needle shaft 64 is in cooperative relationship with indicator needle 69. The circumference of needle shaft 64 is exactly 10 mm to coincide with a 10 mm vertical travel of sensor shaft 70. Accordingly, one revolution of the indicator needle 69 will correspond to a vertical distance of 10 mm representing the movement of sensor shaft 70 in an up or down direction.

With reference to FIG. 5, which shows a fragmentary, semi-schematic view of a blocked lens ready for measurement of its thickness, lens 100 is supported by a thin tape or polymeric film material 102, which in turn rests on a low temperature melting alloy block member 104, which in turn is supported by block member 107.

With reference to FIG. 6, dial gauge 90 is composed of an outer scale 92 and an inner scale 94. The scales 92 and 94 are contained on a rotatable dial face. Numbers on the inner scale 94, representing the diopters, are lined up with needle 69 when sensor shaft 70 is in its lowered position. Outer scale 92 is composed of ten major numbered divisions, (0 to 10.0) each of which represents one millimeter, and in turn, each of the divisions is divided into ten subdivisions each of which represents 0.1 millimeter. A complete revolution of indicator needle 69, therefore, represents ten millimeters. Inner scale 94 is subdivided into approximately fifteen numbered divisions (0 to 15) and in turn, each of the divisions is further divided into four subdivisions, except that subdivision between 14 and 0 is divided into three subdivisions. The highest diopter which can be read on said inner scale is 14.62. Accordingly, ten millimeters on outer scale 92 correspond to 14.62 diopters on inner scale 94. By way of another example to illustrate the relationship of the two scales, 5 millimeters on outer scale 92 correspond to 8.15 diopters on inner scale 94.

Referring to FIG. 7, in base support member 20 is situated ring member 22, said ring member having an opening therein. Block member 104 is so positioned in the opening of said ring member 22 that the same allows, without interference, intimate contact between a tape or polymeric material 102 covering the convex surface of lens 100. Sensor shaft 70 having sensor shaft tip 72 contacts the concave surface of lens 100 at point 106.

In describing the operating principle on which measurements of the lens is based, in FIG. 7: R denotes the radius of the front curve of the lens in millimeters; and I denotes the inside diameter of ring member 22 in millimeters. The mathematical relationship between these quantities are as follows:

$$K = R - \left(R^2 - \frac{I^2}{4}\right)^{\frac{1}{2}} \quad \text{(Eq. 1)}$$

and $$D = \frac{(N-1) \, 1000}{R} \quad \text{(Eq. 2)}$$

wherein:

N is the index of refraction of the lens material, typically N=1.530;

K is the distance in millimeters between the arrows shown in FIG. 7 between Reference Plane and the front curve of lens 100 and represents calculated values; and D is the dioptric power of the front surface of the lens.

The present invention provides for measuring the thickness of a blocked lens and indirectly its front surface dioptric power. Thus, for example, it is necessary to determine how much material must be removed from a semi-finished lens at the lens generating station. This thickness is crucial to the determination of the final prescriptive power as well as to the aesthetics of a cosmetically acceptable lens. For example, to calculate the desired thickness of a lens using FIGS. 6 and 7 and Equations 1 and 2, a six diopter front curve has a radius R of 88.33 mm and this computes to a value of 3.61 mm if I is equal to 50 mm. Normally, the 3.61 mm would simply be read as 3.6 mm. Then to measure the actual thickness of the lens: the movable dial face having inner scale 94 thereon is set to 6 with the sensor shaft 70 fully extended and then sensor shaft 70 is raised to allow the blocked lens to be inserted into ring 22; then sensor shaft 70 is released so that sensor shaft tip 72 is brought into contact with the concave surface of lens 100 at point 106. The thickness of the lens 100 is then read on the outer scale 92.

Thicknesses of up to 10 mm may be read directly from the gauge; however, thicknesses beyond 10 mm may also be read directly by simply adding 10 mm to the indicated values.

Conversely, inner scale 94 settings up to 14.62 diopters are directly imprinted on the dial face and additional range extensions may be used by subtracting 14.62 diopters from the desired power.

As understood from the above detailed description, the Blocked Lens Thickness Gauge of the present invention is shockproof and thus prevents the component parts from being damaged. This insures maintenance of high accuracy in measurements of lens thickness and surface diopter.

While the invention has been described and shown in what is presently conceived to be a preferred embodiment thereof, it will be apparent to those of ordinary skill in the art that many modifications may be made thereof within the scope of the invention, which scope is to be accorded the broadest interpretation of the appended claims so as to encompass all equivalent structures and uses of same.

What is claimed is:

1. A blocked lens thickness gauge comprising in combination:
   a generally rectangular base support member having a ring member thereon proximal to one end thereof:
   a vertical support member projecting perpendicularly from said base support member and proximal to the other end of said base support member;
   a horizontal support member projecting from said vertical support member distally positioned from the parallel to said base support member;
   a plunger support assembly and
   a needle support assembly suspended from said horizontal support member, said assemblies housing:
   a rigid lens contacting sensor shaft terminating in a single fixed point for contacting a lens surface and supported between two sets of orthogonally mounted ball bearings; and a needle shaft positioned orthognally to said lens contacting sensor shaft in a cooperating relationship; said needle shaft being supported on spring-loaded bearings such that the needle shaft is urged toward the lens contacting sensor shaft by said spring loaded bearings; and
   indicator means connected to one end of said needle shaft and responsive to movement of said sensor shaft for indicating the thickness of a lens supported by said ring member.

2. A blocked lens thickness gauge according to claim 1 wherein said indicator means comprises:
   an outer scale and
   an inner scale contained on a rotatable dial face; and
   an indicator needle;
   said outer scale representing ten millimeter vertical movement of said lens contacting sensor shaft upon one complete revolution of said indicator needle and said inner scale representing diopters.

3. A blocked lens thickness gauge according to claim 2 wherein said outer scale is composed of uniformly spaced divisions.

4. A blocked lens thickness gauge according to claim 2 wherein said outer scale is composed of ten major uniformly spaced number divisions, each division representing one millimeter vertical movement of said lens contacting sensor shaft.

5. A blocked lens thickness gauge according to claim 4 wherein each of the ten major number divisions is divided into ten subdivisions, each of said subdivisions representing 0.1 millimeter vertical movement of said lens contacting sensor shaft.

6. A blocked lens thickness gauge according to claim 2 wherein said inner scale is subdivided into 14.62 numbered divisions.

7. The blocked thickness gauge of claim 6 wherein the numbered divisions represent diopters.

8. A blocked lens thickness gauge for measuring the front surface power of a concave lens comprising in combination:
   a generally rectangular base support member having a ring member thereon proximal to one end thereof, said ring member to support said concave lens to be measured;
   a vertical support member projecting perpendicularly from said base support member and proximal to the other end of said base support member;
   a horizontal support member projecting from said vertical support member distally positioned from and parallel to said base support member;
   a plunger support assembly and
   a needle support assembly suspended from said horizontal support member, said assemblies housing:
   a rigid lens contacting sensor shaft terminating in a single fixed point for contacting a lens surface and supported between two sets of orthogonally mounted ball bearings; and a needle shaft positioned orthogonally to said lens contacting sensor shaft in a cooperating relationship; said needle shaft being supported on spring-loaded bearings such that the needle shaft is urged toward the lens contacting sensor shaft by said spring loaded bearings; and
   indicator means connected to one end of said needle shaft and responsive to movement of said sensor shaft for indicating the thickness of a lens supported by said ring member,
   wherein said indicator means comprises:
   an outer scale and
   an inner scale contained on a rotatable dial face; and
   an indicator needle;
   said outer scale representing ten millimeter vertical movement of said lens contacting sensor shaft upon one complete revolution of said indicator needle from 0 to 10 and said inner scale representing diopters,
   wherein the location of any of the diopters from said 0 mark on said outer scale is given by the equations:

$$K = R - \left(R^2 - \frac{I^2}{4}\right)^{\frac{1}{2}} \quad \text{(Eq. 1)}$$

and $$D = \frac{(N-1)\,1000}{R} \quad \text{(Eq. 2)}$$

wherein:
R = radius of the curve of the lens;
I = diameter of the ring member;
K = calculated value from Equation 1;
N = index of refraction; and
D = dioptric power wherein linear dimensions are in millimeters.

9. A method of measuring the thickness of a lens by using a blocked lens thickness gauge, said blocked lens thickness gauge comprising in combination:
   a generally rectangular base support member having a ring member thereon proximal to one end thereof;
   a vertical support member projecting perpendicularly from said base support member and proximal to the other end of said base support member;
   a horizontal support member projecting from said vertical support member distally positioned from and parallel to said base support member;
   a plunger support assembly and
   a needle support assembly suspended from said horizontal support member, said assemblies housing:
   a rigid lens contacting sensor shaft terminating in a single fixed point for contacting a lens surface and supported between two sets of orthogonally mounted ball bearings; and a needle shaft positioned orthogonally to said lens contacting sensors shaft in a cooperating relationship; said needle shaft being supported on spring-loaded bearings such that the needle shaft is urged toward the lens contacting sensor shaft by said spring loaded bearings; and indicator means connected to one end of said needle shaft and responsive to movement of said sensor shaft for indicating the thickness of a lens supported by said ring member, wherein said indicator means comprises:

an outer scale and an inner scale contained on a rotatable dial face; and an indicator needle;

said outer scale representing ten millimeter vertical movement of said lens contacting sensor shaft upon one complete revolution of said indicator needle from 0 to 10 and said inner scale representing diopters, said method of measuring the thickness of said lens comprising the steps of:

(a) with sensor shaft fully extended, rotating said dial face until said indicator needle indicates the front surface power of the lens on said inner scale;

(b) raising said sensor shaft to allow placing of said lens onto said ring member;

(c) placing said lens onto said ring member;

(d) lowering said sensor shaft so as to contact the concave surface of said lens therewith; and (e) reading on said outer scale the number pointed to by said indicator needle, said number denoting the thickness in millimeters of said lens.

* * * * *